(12) United States Patent
McBride et al.

(10) Patent No.: US 7,561,030 B2
(45) Date of Patent: Jul. 14, 2009

(54) AMBIENT NOISE CONTROLLED BUZZER ANSWERBACK

(75) Inventors: Justin P. McBride, West Bloomfield, MI (US); Thomas J. Keeling, Plymouth, MI (US); Christopher M. Kurpinski, Berkley, MI (US); Toshihiro T. Wakamatsu, West Bloomfield, MI (US); Michael A. Wiegand, Birmingham, MI (US)

(73) Assignee: DENSO International America, Inc., Southfield, MI (US)

( * ) Notice: Subject to any disclaimer, the term of this patent is extended or adjusted under 35 U.S.C. 154(b) by 352 days.

(21) Appl. No.: 11/689,218

(22) Filed: Mar. 21, 2007

(65) Prior Publication Data

US 2008/0231433 A1    Sep. 25, 2008

(51) Int. Cl.
*B60R 25/10* (2006.01)
*G08B 3/00* (2006.01)
*H03G 3/20* (2006.01)

(52) U.S. Cl. .................. 340/426.13; 340/426.17; 340/426.18; 340/426.19; 340/426.24; 340/426.36; 340/426.35; 340/692; 340/384.1; 307/10.1; 381/57; 381/86

(58) Field of Classification Search ............ 340/426.13, 340/426.36, 426.35
See application file for complete search history.

(56) References Cited

U.S. PATENT DOCUMENTS

| 4,342,023 | A  | 7/1982 | Tsunoda et al. |
| 6,049,268 | A  | 4/2000 | Flick |
| 6,927,685 | B2 | 8/2005 | Wathen |
| 6,998,967 | B2 | 2/2006 | Brillon et al. |

*Primary Examiner*—Donnie L Crosland
(74) *Attorney, Agent, or Firm*—Harness, Dickey & Pierce, PLC

(57) ABSTRACT

A vehicle remote control system can have a transmitter transmitting a signal, a receiver receiving the signal, and a control device in communication with the receiver and controlling at least one operation of the vehicle. A selected operation may be executable by the signal. The vehicle remote control system includes a microphone that can determine an ambient noise volume and an ambient noise frequency in an area around the vehicle and is in communication with the control device. Furthermore, the vehicle remote control system includes a speaker that is able to generate an answer signal to confirm that the selected operation was executed. The speaker is in communication with the control device which generates an answer signal as a function of ambient noise volume and the ambient noise frequency in the area surrounding the vehicle.

22 Claims, 2 Drawing Sheets

AMBIENT NOISE CONTROLLED BUZZER ANSWERBACK

INTRODUCTION

Figure 1:
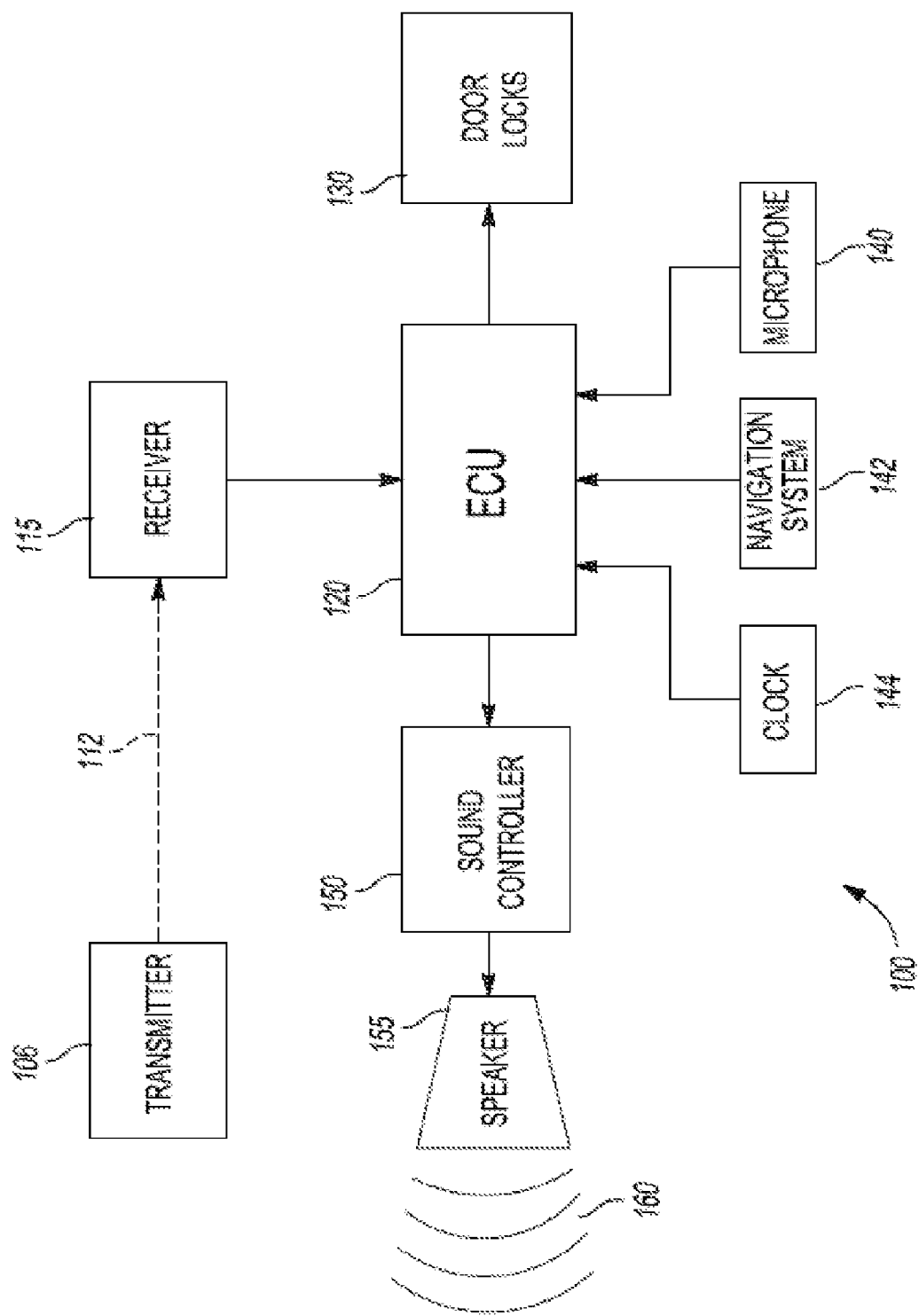

Traditional vehicle access technology typically includes a lock for which a metal key is needed to manually, mechanically lock or unlock a vehicle door. Current conventional vehicle access technology allows locking or unlocking one or more vehicle doors from a remote location. For example, a user may unlock a vehicle using a remote access device such as a key fob. A key fob is a device that includes an authentication mechanism to control access to the vehicle. Alternatively, a vehicle access device may be integrated into a vehicle key, an access card, or integrated with another device such as a mobile phone or a PDA.

Typically, when a vehicle is locked or unlocked using the remote access device, an answerback, such as a toot or sounding of a horn, or a flash of an exterior light, may be produced by the vehicle to confirm that the vehicle performed a function that was requested by the remote access device. In a world in which ambient background noise is ever increasing, it may be difficult for a user to hear an audible answerback in certain environments. There is a need that exists to improve remote access devices, vehicle remote control systems, and the corresponding vehicle answerback in certain environments.

SUMMARY

Accordingly, in some embodiments, a vehicle remote control system can have a transmitter transmitting a signal, a receiver receiving the signal, and a control device in communication with the receiver and controlling at least one operation of the vehicle. A selected vehicle operation may be executable by the signal. The vehicle remote control system includes a microphone that can determine an ambient noise volume and an ambient noise frequency in an area around the vehicle and is in communication with the control device. Furthermore, the vehicle remote control system includes a speaker that is able to generate an answer signal to confirm that the selected vehicle operation was executed. The speaker is in communication with the control device which generates an answer signal as a function of ambient noise volume and the ambient noise frequency in the area surrounding the vehicle.

In some embodiments, the present teachings provide a vehicle with a remote control system. The system may include a vehicle, a remote control transmitter, a receiver, a signal generator, a signal controller, an ambient noise sensor, a clock, and a control device in communication with the clock, the receiver, and the sensor. The control device controls a function of the vehicle in response to a signal from the remote control transmitter. The control device further being in communication with and controlling the signal controller such that when the receiver receives the signal from the remote control transmitter, the control device controls the function of the vehicle and causes the signal controller to produce an answer signal which is dependent on the time of day, the ambient noise volume, and the ambient noise frequency, as determined by the ambient noise sensor.

In addition, the present teachings provide a method of controlling a function of a vehicle from a remote location. The method may include providing a remote control transmitter, sending a signal to the receiver in the vehicle, and performing a vehicle operation in response to the signal from the transmitter. The method may further include determining an ambient noise volume and frequency in an area around the vehicle and outputting an audible confirmation signal as a function of the ambient noise volume and ambient noise frequency in the area around the vehicle.

Further areas of applicability will become apparent from the description provided herein. It should be understood that the description and specific examples are intended for purposes of illustration only and are not intended to limit the scope of the present teachings.

DRAWINGS

Figure 2:
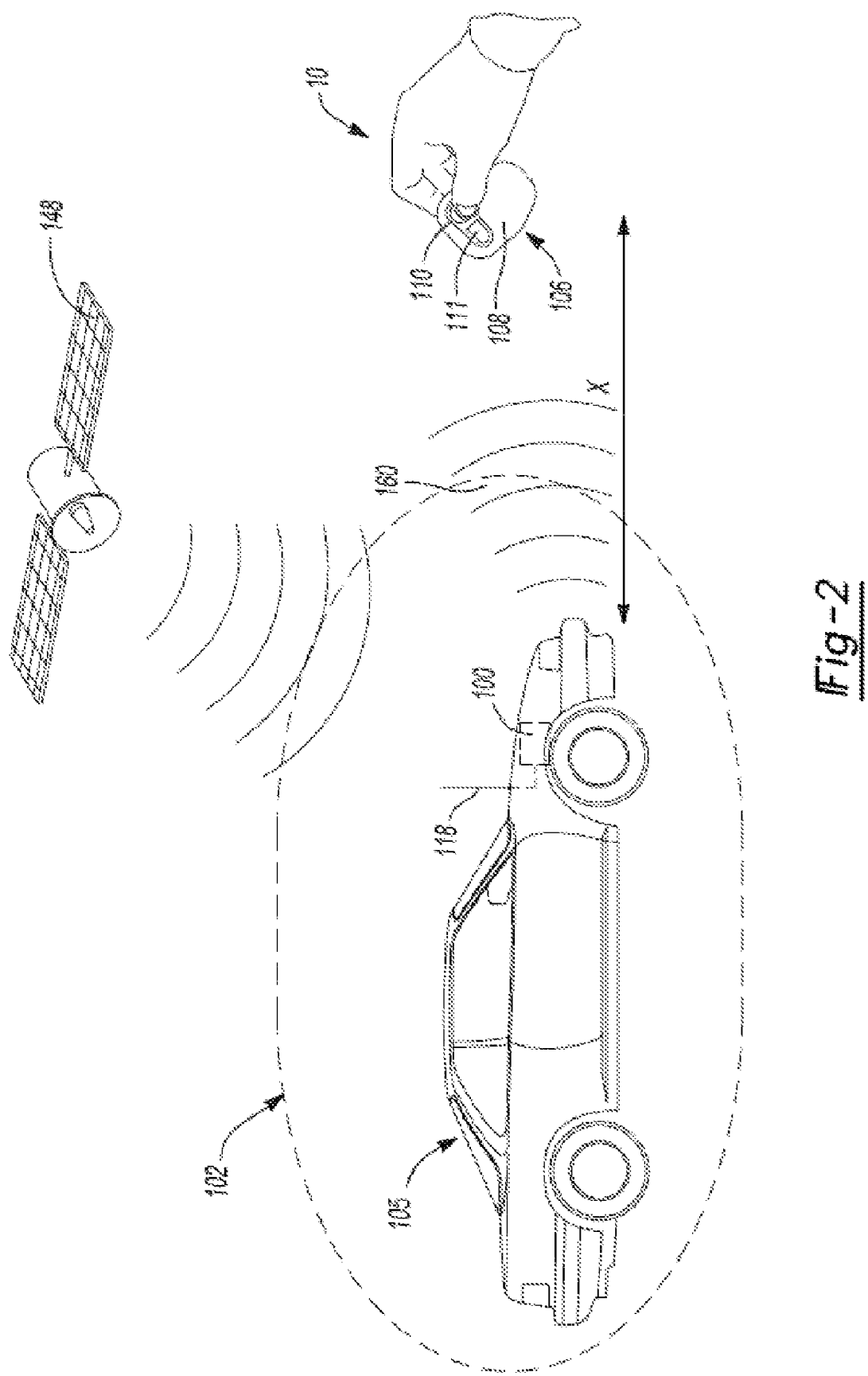

The drawings described herein are for illustration purposes only and are not intended to limit the scope of the present disclosure in any way. The present teachings will become more fully understood from the detailed description and the accompanying drawings wherein:

FIG. 1 is a block diagram that depicts various components of the vehicle remote control system according to some embodiments of the present teachings; and FIG. 2 is a side view of a vehicle which includes a vehicle remote control system according to some embodiments of the present teachings.

DETAILED DESCRIPTION

The following description merely exemplary in nature and is not intended to limit the present teachings, applications, or uses. It should be understood that throughout the drawings, corresponding reference numerals indicate like or corresponding parts and features. The description of specific examples indicated in some embodiments of the present teachings are intended for purposes of illustration only and are not intended to limit the scope of the teachings disclosed herein. Moreover, recitation of multiple embodiments having stated features is not intended to exclude other embodiments having additional features or other embodiments incorporating different combinations of the stated features.

The citation of references herein does not constitute admission that those references are prior art or have relevance to the patentability of the teachings disclosed herein. All references cited in the Description section of the specification are hereby incorporated by reference in their entirety for all purposes. In the event that one or more of the incorporated references, literature, and similar materials differs from or contradicts this application, including, but not limited to, defined terms, term usage, described techniques, or the like, this application controls.

Referring now to FIG. 1, a block diagram illustrates the vehicle remote control system 100 according to some embodiments of the present teachings. Vehicle remote control system 100 comprises at least receiver 115, electronic control unit (ECU) 120, ambient noise sensor, such as, microphone 140, and signal generator 155. Remote access device 106 can transmit at least one signal 112 to receiver 115. As illustrated in FIG. 2, remote access device 106 comprises transmitter, housing 108, and actuator 110. In some embodiments, remote access device 106 may include second actuator 111. Actuator 110 and second actuator 111 can be buttons which may be physical, mechanical buttons or buttons on a touch screen. In some embodiments, remote access device 106 can include a locator within housing 108.

A user 10 can employ actuator 110 to send signal 112 from the remote access device 106 to the receiver 115, which is in communication with ECU 120. Typically, in automotive electronics, ECU 120 is an embedded system that controls one or more of the electrical subsystem 130 in vehicle 105. In some embodiments, the subsystem 130 can be one of a door locking system, a vehicle ignition system, an alarm system, a vehicle climate control system, and a welcome feature. In some embodiments, actuator 110 may allow user 10 to activate subsystem 130 and second actuator 111 may allow user 10 to activate a second subsystem (not shown). A microphone 140 is in communication with the ECU 120 such that when receiver 115 receives signal 112, microphone 140 is activated to analyze sound (ambient noise) in an area 102 surrounding vehicle 105. ECU 120 is in communication with the signal generator 155 such as, for example, a speaker, while signal generator 155 is in communication with a sound controller 150. Non-limiting examples of signal generator 155 include but are not limited to a loud speaker, a buzzer, a piezo electric device, a horn, a siren, and the like. Sound controller 150 may be a separate unit or may be integrated into ECU 120. When ECU 120 communicates with subsystem 130 to perform a function, ECU 120 communicates with signal generator 155 to provide an answerback signal 160 to user 10. Answerback signal 160 may be generated simultaneously with ECU 120 command to subsystem 130 to perform a function or may be generated after subsystem 130 has performed the function.

The answerback signal 160 is generated as a function of the ambient noise volume and ambient noise frequency in area 102 surrounding vehicle 105 as analyzed by microphone 140. Sound controller 150 receives information from microphone 140 and determines answerback signal 160 based on background (ambient) noise volume in decibels in area 102 and background (ambient) noise frequency (e.g. pitch) in area 102. The area 102 is depicted as an example of the area surrounding the vehicle 10 within such area the microphone 140 is able to receive ambient noise volume and frequency readings. The area around the vehicle 10, within which the microphone 140 is able to receive volume and frequency information, may be increased or decreased by altering the sensitivity of the microphone 140; for example, the area around the vehicle may be considered as that area an encompassing radius from the vehicle center when the vehicle is viewed from the top.

For example, vehicle 105 is parked in a noisy city center, microphone 140 analyzes the background noise volume, which may be high due to traffic, pedestrians, construction, mass transit operations, street vendors, sirens, and other such sounds typical for a city center. Microphone 140 determines the volume of the noise in area 102, as well as the frequency of the noise in area 102 surrounding vehicle 105 while sound controller 150 provides answerback signal 160 generated by signal generator 155, which is loud enough and is distinguishable in frequency (pitch) from the background noise.

In another non-limiting example, vehicle 105 is parked late at night in a driveway in a residential area and user 10 pushes actuator 110 to lock the doors of vehicle 105. Microphone 140 analyzes noise volume and noise frequency surrounding vehicle 105, the ECU 120 commands subsystem 130 to lock doors and sound controller 150 provides answerback signal 160 generated by signal generator 155 that is of a low volume and low or high frequency (pitch) such that the act of locking the doors of vehicle 105 and corresponding answerback signal 160 does not wake neighbors in the residential area 102 surrounding vehicle 105.

In another example, which may be used in conjunction with the other embodiments, the frequency (pitch) of the answerback signal 160 may be generated in accordance with the loudest or most voluminous of the particular frequencies received by microphone 140. For instance, if microphone 140 receives a first frequency of a first noise that is of a first volume, and a second frequency of a second noise that is of a second volume, and if the volume of the second noise is greater than that of the first noise, then the response, in volume and frequency, from the signal generator 155 may be generated in response to the frequency and volume of the loudest or most voluminous noise, such as the second noise.

In some embodiments, remote control system 100 can include microphone 140 and clock 144 in communication with ECU 120 to provide information to sound controller 150. Sound controller 150 can receive information from microphone 140, as discussed herein, and information from clock 144 to provide an appropriate answerback signal 160 that is generated by sound generator 155. For example, to ensure a low volume and low or high frequency (pitch) answerback signal 160 late at night, sound controller 150 receives information from microphone 140 on the noise volume and noise frequency in area 102 of vehicle 105 and receives the time of day from clock 144. Sound controller 150 may be programmed to generate a lower volume answerback signal 160 late at night (e.g. 10:00 p.m.) so not to wake neighbors, as discussed herein. Similarly, sound controller 150 may be programmed to provide a high volume and variable (adjustable) frequency (pitch) answerback signal 160 during daylight hours. Furthermore, sound controller 150 can generate an answerback signal 160 as a function of ambient noise volume and time of day. Sound controller 150 can generate an answerback signal 160 as a function of ambient noise frequency (pitch) and time of day, or, as a function of ambient noise volume, ambient noise frequency (pitch), and time of day.

In some embodiments, remote control system 100 can include microphone 140, clock 144, and navigation system 142 in communication with ECU 120, while sound controller 150 can receive information from microphone 140, clock 144, and navigation system 142 to provide an appropriate answerback signal 160 that is generated by signal generator 155. Navigation system 142 may be, or be equipped with, a global positioning system (GPS). Navigation system 142 communicates with a GPS satellite 148 via GPS antennae 118. The navigation system 142 determines the location of vehicle 105 according to data received from GPS satellite 148. Navigation system 142 provides information as to a location of vehicle 105 and sound controller 150 generates appropriate answerback signal 160 to be generated by signal generator 155 based on the location of vehicle 105. For example, navigation system 142 determines vehicle 105 is located in a city center and sound controller 150 is programmed to produce answerback signal 160 that is of a higher volume and a frequency (pitch) that is appropriate to be distinguishable in a city center environment. For example, if the city center environment is determined to have concentrations of low frequencies, such as from vehicle internal combustion engines or that generated from rolling tires on pavement, or even construction equipment, the answerback signal 160 may be one of a high frequency (pitch), much different from a vehicle horn. In another non-limiting example, navigation system 142 may determine that vehicle 105 is in a residential neighborhood and, as such, sound controller 150 can be programmed to generate an answerback signal 160 with an appropriate volume and frequency (pitch) that is distinguishable above background noise in residential areas.

In some embodiments, sound controller 150 receives information from microphone 140, clock 144, and navigation system 142. Sound controller 150 may be programmed to receive information from microphone 140, clock 144, and navigation system 142 and generate an appropriate answerback signal 160 based on the information from any or all of the three sources. Sound controller 150 can generate an answerback signal 160 as a function of ambient noise volume and location of vehicle 105. Sound controller 150 can generate an answerback signal 160 as a function of ambient noise frequency (pitch) and location of vehicle 105. Furthermore, sound controller 150 can generate an answerback signal 160 as a function of ambient noise volume, ambient noise frequency (pitch), and location of vehicle 105. Moreover, sound controller 150 can generate an answerback signal 160 as a function of ambient noise volume, ambient noise frequency (pitch), location of vehicle 105, and time of day. Sound controller 150 can generate an answerback signal 160 as a function of time of day and location of vehicle 105. In some embodiments, user 10 can program waypoints in the navigation system 142 such that when vehicle 105 is identified to be at a waypoint, a user 10 defined answerback signal 160 may be generated. Waypoints are sets of coordinates that identify a point in physical space and usually include longitude and latitude, and sometimes altitude. In some embodiments, sound controller 150 can be used and programmable by time of the day such that user 10 programs a user 10 defined answerback signal 160 that would be produced at certain times during the day. In some embodiments, sound controller 150 may be programmable by user 10 for both time of day and location of vehicle 105, such as a waypoint for a user 10 defined answerback signal 160.

In some embodiments, remote access device 106 can comprise a locator within housing 108. The locator may be an RFID-type tag or GPS-type locator. In some embodiments, remote control system 100 can include microphone 140 and a locator. A locator can determine distance X that remote access device 106 is away from vehicle 105. Sound controller 150 can receive information from microphone 140, as discussed herein, and information from the locator to provide an appropriate answerback signal 160 that is generated by sound generator 155. For example, if distance X is great (e.g. 100 feet), the volume of answerback signal 160 is increased and the frequency (pitch) of answerback signal 160 can be raised to a higher value (Hz) in the audible range of the human ear. As will be apparent to the person skilled in the art, distance X can be determined without a locator but, rather, based on the strength of signal 112. For example, if signal 112 is strong, it can be extrapolated that the remote access device 106 is close (e.g. 10 feet) to vehicle 105, so distance X is small and if signal 112 is weak, it can be extrapolated that the remote access device 106 is far away but still in range of vehicle 105, so distance X is large. In some embodiments, remote control system 100 can include microphone 140, clock 144, and locator that provide information to sound controller 150. Sound controller 150 may be programmed to receive information from microphone 140, clock 144, navigation system 142, and distance X in order to generate an appropriate answerback signal 160 based on the information from any and all of the four sources. Moreover, sound controller 150 can generate answerback signal 160 as a function of ambient noise volume, ambient noise frequency (pitch), location of vehicle 105, and distance X that remote access device 106 is away from vehicle 105. Sound controller 150 can generate an answerback signal 160 as a function of ambient noise volume, ambient noise frequency (pitch), time of day, and distance X that remote access device 106 is away from vehicle 105. Moreover, sound controller 150 can generate an answerback signal 160 as a function ambient noise volume, ambient noise frequency (pitch), location of vehicle 105, time of day, and distance X that remote access device 106 is away from vehicle 105. It will be apparent to the person skilled in the art that sound controller 150 can generate an answerback signal 160 as a function of any combination of ambient noise volume, ambient noise frequency (pitch), location of vehicle 105, time of day, and distance X that remote access device 106 is away from vehicle 105. All combinations may be available in vehicle 105 and user 110 may choose to program any or all of ambient noise volume, ambient noise frequency (pitch), location of vehicle 105, time of day, and distance X in determining the appropriate answerback signal 160 that may be provided to signal generator 155.

In addition, the present teachings provide methods of controlling a function of a vehicle from a remote location. The method includes providing a remote access device 106, sending signal 112 to receiver 115 in vehicle 105 and performing a vehicle operation in response to signal 112 from remote access device 106. The method further includes determining an ambient noise volume and ambient noise frequency (pitch) around the area 102 of vehicle 105. Microphone 140 may be used to determine ambient noise volume and ambient noise frequency (pitch) in area 102 around vehicle 105, as discussed herein. In addition, the method includes outputting answerback signal 160 as a function of the ambient noise volume and ambient noise frequency (pitch) in area 102 around vehicle 105. The method may include performing a function such as locking or unlocking doors of vehicle 105. The method can further include performing a function such as in vehicle ignition operations such as starting up or shutting off an engine of vehicle 105. Moreover, the method can include performing a function such as arming or disarming an alarm of a vehicle 105. The method can include performing a function such as providing a welcome feature. Still further, the method can include performing a function such as heating or cooling an interior of the vehicle 105. In some embodiments of the method, remote access device 106 may provide more than one signal 112 such that more than one function may be performed by more than one subsystem 130. When more than one signal 112 is used, more than one answerback signal 160 may be provided by sound controller 150 and generated by signal generator 155. The more than one answerback signal 160 may be a function of any of the combinations described herein. As such, the answerback signal 160 may include successive transmissions, such as a first answerback signal and a second answerback signal. Each of the first and second answerback signals may have its own volume and frequency (pitch) associated with it to distinguish between the vehicle function performed in accordance with the signal 112 received.

In some embodiments, the vehicle remote control system 100 can be used with a vehicle welcome feature. A welcome feature can be of any suitable type, such as illuminating the light, creating a sound with the signal generator 155, turning on the vehicle's ignition, playing a pre-selected sound clip, playing music or otherwise. Accordingly, by initiating the welcome feature, the vehicle 105 "welcomes" the user. This can be useful for distinguishing the vehicle 105 owned by user 10 from others in a crowded parking lot, for warding off undesirable people near the vehicle 105, or otherwise. The vehicle feature is described in commonly owned U.S. patent application Ser. No. 11/680,755 filed Mar. 1, 2007 and incorporated herein by reference.

When using the vehicle remote control system 100 with a vehicle welcome feature that is audible, such as a horn, a ring tone, a music clip and the like, an appropriate audible welcome feature can be chosen as a function of the ambient noise. Using the systems, devices, and methods described herein with an audible welcome feature, sound controller 150 can generate an audible welcome feature as a function of ambient noise volume, as a function of ambient noise frequency (pitch) or as a function of ambient noise volume and ambient noise frequency (pitch).

Furthermore, sound controller 150 can generate an audible welcome feature as a function of ambient noise volume and time of day. Sound controller 150 can generate an audible welcome feature as a function of ambient noise frequency (pitch) and time of day, or, as a function of ambient noise volume, ambient noise frequency (pitch), and time of day. Moreover, sound controller 150 can generate an audible welcome feature as a function of ambient noise volume and location of vehicle 105. Sound controller 150 can generate an audible welcome feature as a function of ambient noise frequency (pitch) (pitch) and location of vehicle 105. Furthermore, sound controller 150 can generate an audible welcome feature as a function of ambient noise volume, ambient noise frequency (pitch), and location of vehicle 105. Moreover, sound controller 150 can generate an audible welcome feature as a function of ambient noise volume, ambient noise frequency (pitch), location of vehicle 105, and time of day.

Moreover, sound controller 150 can generate audible welcome feature as a function of ambient noise volume, ambient noise frequency (pitch), location of vehicle 105, and distance X that remote access device 106 is away from vehicle 105. Sound controller 150 can generate an audible welcome feature as a function of ambient noise volume, ambient noise frequency (pitch), time of day, and distance X that remote access device 106 is away from vehicle 105. Moreover, sound controller 150 can generate an audible welcome feature as a function ambient noise volume, ambient noise frequency (pitch), location of vehicle 105, time of day, and distance X that remote access device 106 is away from vehicle 105. It will be apparent to the person skilled in the art that sound controller 150 can generate an audible welcome feature as a function of any combination of ambient noise volume, ambient noise frequency (pitch), location of vehicle 105, time of day, and distance X that remote access device 106 is away from vehicle 105. All combinations may be available in vehicle 105 and user 110 may choose to program any or all of ambient noise volume, ambient noise frequency (pitch), location of vehicle 105, time of day, and distance X in determining the appropriate audible welcome feature that may be provided to signal generator 155.

In some embodiments, remote access device 106 may be a passive key, such as a smart key, an electronic key, a key fob, and the like In such embodiments, actuator 110 does not have to employed for communication of remote access device 106 with vehicle 105. In some embodiments, a vehicle 105 can have a plurality of sensors and antennas at various locations (not shown), all in communication with a controller, such as a ECU 120. More specifically, a vehicle 105 may employ a ECU 120 used in conjunction with various antennae such as a driver door antennae, a driver side rear door antennae, a passenger front door antennae, a passenger side rear door antennae, a trunk area antennae, and an interior antennae. The ECU 120, used in conjunction with the antennas, is used to place particular vehicle doors into a standby mode prior to unlocking by a user 10 (a driver). An interior antennae is used to check for a remote access device 106 that may be left in the interior of the vehicle 105 during a locking routine.

The unlock standby mode is activated without human manipulation of any of the actuator 110 or second actuator 111 on the remote access device 106. To accomplish automatic door locking or unlocking, the user 10 simply possesses a remote access device 106, which may also be known as a key fob, a smart key, a transponder or electronic key that emits a frequency response to at least one of the antennas when the user 10 approaches the vehicle 105. The frequency can be a specific radio frequency that is in communication with the antennae on-board the vehicle 105. Subsequent to such communication, when the user 10 then, for example, touches a sensor on the door with respect to the door lock that respective door lock will unlock. The user 10 may then pull on the respective door handle to complete the opening of the door to gain access to the vehicle 105.

Unlocking the vehicle door locks can be accomplished in another process. For example, in a passive vehicle access system, before a user 10 approaches a vehicle 105 that is, when the user 10 is outside of communication access range of the ECU 120, the ECU 120 causes a specific radio signal to be emitted in a polling fashion from the various antennas located within and about the vehicle 105. The signal is pulsed as a specific time integral but may be pulsed in a polling fashion taking into consideration all on-board antennas. The communication radius may be about 3 to about 4 feet as an example but may be determined by the manufacturer.

When the remote access device 106 is within the communication radius of an antennae, the remote access device 106 may transmit a unique security code to the ECU 120. When the ECU 120 recognizes the unique security code, the door locks of the vehicle 105 are placed into unlock standby mode. When in the unlock standby mode, the handle may be touched to activate a contact sensor which unlocks the door to allow access to the vehicle 105.

Alternatively, when locking a door of a vehicle 105, the user 10 has possession of a remote access device 106 when exiting the vehicle 105 and closes all vehicle doors. The user 10 remains standing within the transmitting range of an antennae which may be located within a door. The remote access device 106 is communicating with the signal of the antennae which is governed by a ECU 120. With the user 10 in this position, because remote access device 106 and ECU are able to communicate, the doors are not locked. When the user 10 walks away from the vehicle 105 and becomes out of range or out of zone of the polling signal transmitted by the antennae, the doors of the vehicle 105 lock.

Some embodiments and the examples described herein are exemplary and not intended to be limiting in describing the full scope of compositions and methods of these teachings. Equivalent changes, modifications and variations of some embodiments, materials, compositions and methods can be made within the scope of the present teachings, with substantially similar results.

What is claimed is:

1. A vehicle remote control system comprising:
   a transmitter transmitting a signal;
   a receiver receiving the signal;
   a control device in communication with the receiver, the control device controlling at least one operation of the vehicle;
   a selected operation of the at least one operation being executable by the signal;
   a microphone determining an ambient noise volume and an ambient noise frequency in an area around the vehicle, the microphone in communication with the control device; and
   a signal generator generating an answerback signal confirming the selected operation was executed, the signal generator in communication with the control device generating the answer signal as a function of the ambient noise volume and the ambient noise frequency in the area around the vehicle.

2. The system according to claim 1 further comprising a clock in communication with the control device and generating the answer signal as a function of a time of day.

3. The system according to claim 1 further comprising a navigation system in communication with the control device and generating the answer signal as a function of the location of the vehicle.

4. The system according to claim 1, wherein the volume and frequency of the answer signal is different from the ambient noise volume and the ambient noise frequency as received by the control device.

5. The system according to claim 1, wherein the selected operation is at least one of an ignition operation, an alarm operation, a welcome feature, and a door lock operation.

6. A method of controlling a function of a vehicle from a remote location, the method comprising:
   providing a remote control transmitter;
   sending a signal from the remote control transmitter to a receiver in the vehicle;
   determining an ambient noise volume and an ambient noise frequency in an area around the vehicle;
   performing a vehicle operation in response to the signal from the transmitter; and
   outputting an audible confirmation signal as a function of the ambient noise volume and frequency in the area around the vehicle.

7. The method according to claim 6 further comprising outputting the audible signal as a function of the ambient noise volume and the ambient noise frequency of the area around the vehicle.

8. The method according to claim 6 further comprising determining a location of the vehicle and outputting an audible signal as a function of the ambient noise volume in the area around the vehicle and the location of the vehicle.

9. The method according to claim 6 further comprising determining the time of day and outputting the audible signal as a function of the ambient noise volume in the area around the vehicle and the time of day.

10. The method according to claim 6 further comprising:
    determining a location of the vehicle;
    determining the time of day; and
    outputting the audible signal as a function of the ambient noise volume, the ambient noise frequency, the location of the vehicle, and the time of day.

11. The method according to claim 6, wherein the vehicle function is one of unlocking a door and locking a door.

12. The method according to claim 6, wherein outputting the audible confirmation signal further comprises outputting an audible confirmation signal having a volume and a frequency that are higher than the ambient noise volume and frequency as determined in the area around the vehicle.

13. The method according to claim 6, wherein outputting the audible confirmation signal further comprises outputting an audible confirmation signal having a frequency that is higher than the ambient frequency as determined in the area around the vehicle.

14. The method according to claim 6, wherein outputting the audible confirmation signal further comprises outputting an audible confirmation signal having a volume that is lower than the ambient noise volume and a frequency that is higher that the ambient noise frequency as determined in the area around the vehicle.

15. A vehicle with a remote control system, comprising:
    a remote control transmitter operable to transmit a signal;
    a receiver located in the vehicle and operable to receive the signal from the remote control transmitter;
    a signal controller operable to select from two or more answer signals;
    a signal generator operable to generate a selected answer signal;
    an ambient noise sensor operable to determine an ambient noise volume and ambient noise frequency in an area around the vehicle;
    a clock providing at least a time of day; and
    a control device in communication with the clock, the receiver and the sensor, the control device being operable to control a function of the vehicle in response to the signal from the remote control transmitter, the control device further being in communication with and operable to control the signal controller such that when the receiver receives the signal from the remote control transmitter, the control device controls the function of the vehicle and causes the signal controller to produce the answer signal, the answer signal being generated depending on the time of day, and the ambient noise volume and the ambient noise frequency determined by the ambient noise sensor.

16. The system according to claim 15 further comprising a navigation system providing a location of the vehicle, the navigation system in communication with the control device, and the answer signal being generated depending on the time of day, the location of the vehicle, and the ambient noise volume and the ambient noise frequency determined by the sensor.

17. The system according to claim 15 further comprising a locator system inside a housing of the remote control transmitter, the locator system operable to determine a distance between the remote control transmitter and the vehicle.

18. The system according to claim 17, wherein the answer signal being generated depending on the time of day, the location, the distance, and the ambient noise volume and the ambient noise frequency determined by the sensor.

19. The system according to claim 15, wherein the function is at least one of locking a door, unlocking a door, starting the vehicle, arming an alarm, disarming an alarm, heating an interior of the vehicle, and cooling an interior of the vehicle.

20. The system according to claim 15, wherein the function is providing a welcome feature.

21. The system according to claim 15, wherein the function is activating or deactivating an alarm of the vehicle.

22. The system according to claim 15, wherein the two or more answer signals having at least one of differing decibel levels and differing frequencies.

* * * * *